Figure 1:
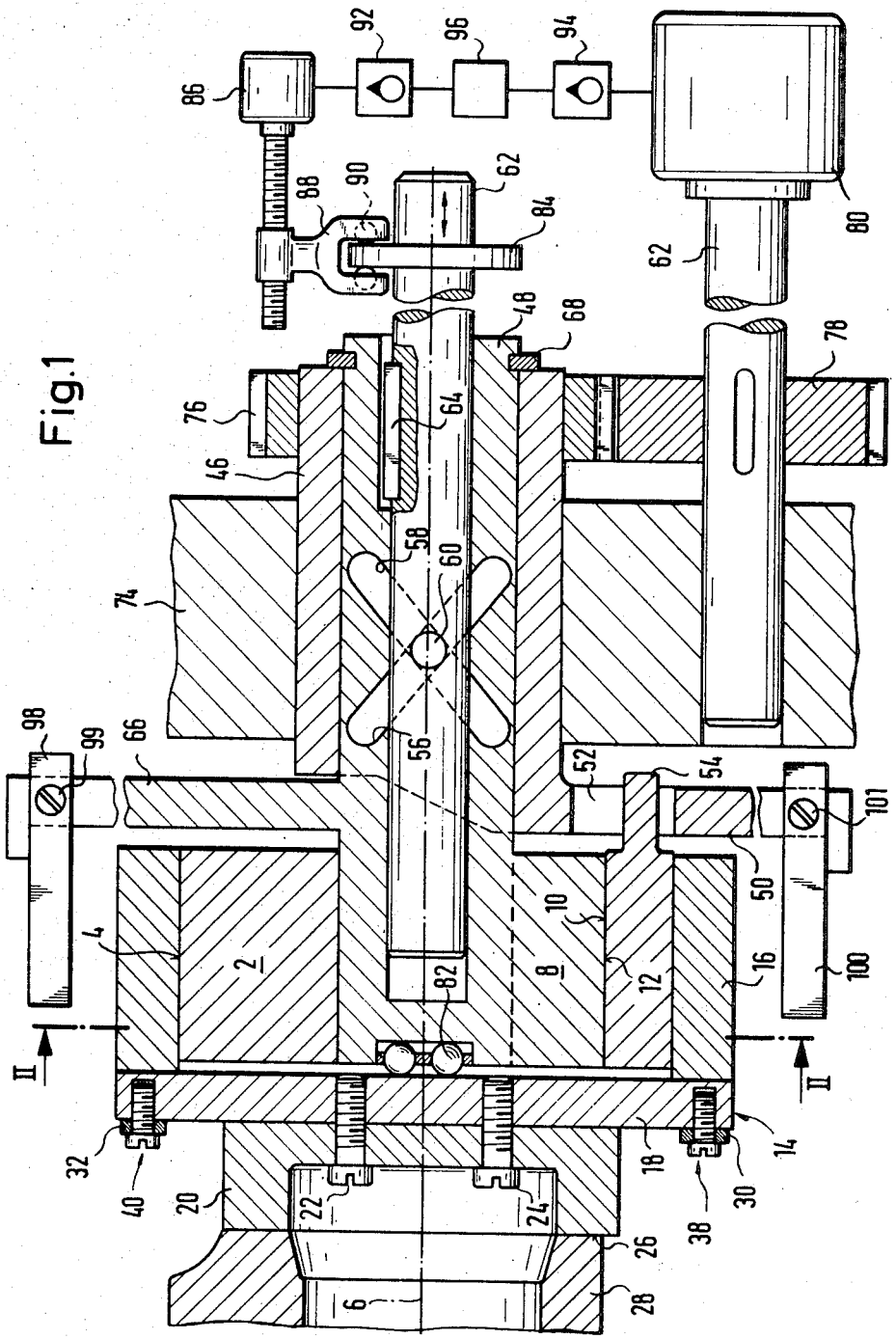

United States Patent [19]
Steigerwald

[11] 3,732,613
[45] May 15, 1973

[54] METHOD AND DEVICE FOR FRICTION WELDING

[76] Inventor: Karl-Heinz Steigerwald, Prinzeneiche 15, Starnberg, Germany

[22] Filed: Dec. 17, 1970

[21] Appl. No.: 98,528

[30] Foreign Application Priority Data

Dec. 18, 1969 Germany..................P 19 63 546.2

[52] U.S. Cl. ....................29/470.3, 156/73, 228/2
[51] Int. Cl. ..........................................B23k 27/00
[58] Field of Search ....................228/2; 29/470.3; 156/73

[56] References Cited

UNITED STATES PATENTS

| | | | |
|---|---|---|---|
| 3,542,275 | 11/1970 | Loyd | 228/2 |
| 3,439,409 | 4/1969 | Bodine, Jr. | 228/1 |
| 3,002,871 | 10/1961 | Tramm et al. | 228/2 |

Primary Examiner—J. Spencer Overholser
Assistant Examiner—Robert J. Craig
Attorney—Nichol M. Sandoe, Roy C. Hopgood, John M. Calimafde, Charles W. Neill, Michael Ebert, Paul H. Blaustein, Eugene J. Kabil and Arthur M. Lueberman

[57] ABSTRACT

The method of friction welding is applicable to surfaces to be welded with any type of marginal boundary. Two workpieces to be welded together are arranged against each other at the surfaces to be welded and are heated to welding temperature by a relative oscillatory movement along such surfaces. The relative oscillatory movement is effected by way of relative rotatory movement with the workpieces remaining substantially parallel to each other.

A device for carrying out the method comprises a workpiece holder driven by an eccentric body rotatable about an axis. A circular rotatory path is defined on the body and the eccentricity of this path is adjustable relatively to said axis, the holder being movable at least two-dimensionally in a plane corresponding to the orientation of the surface to be welded. The holder is guided on the path of progression of the eccentric body so that, upon rotation of that body, all parts of the holder perform rotatory movements of equal size and circular shape with a radius equal to the adjusted eccentricity of the eccentric body.

24 Claims, 4 Drawing Figures

METHOD AND DEVICE FOR FRICTION WELDING

FIELD OF THE INVENTION

The invention relates to methods and devices for friction welding of surfaces, the surfaces to be welded being of any type of marginal boundary.

Friction welding is generally carried out in such a way that the workpieces to be welded together are started into a relative rotational movement, and during this procedure are pressed against each other along the surfaces to be welded. In the welding of tubular objects this method provides satisfactory results with welding surfaces normal to the axis of the tube, since in this instance the relative velocity of motion of the cross-sectional areas adjacent to each other on the surface for welding is more or less similar at all locations or is only slightly different, so that the generally valid requirement in friction welding that the output of heat per unit of surface should be approximately uniform over the entire cross-section to be welded is substantially fulfilled. However, in the welding of tubes whose wall thickness is comparable to their diameter, and in the welding of solid cylindrical workpieces, difficulties arise since the relative velocity of motion of the two workpieces is distinctly less in surface areas closer to the axis than in the areas at a distance from the axis. The difficulties naturally occur to the same or, indeed, to a greater degree in the case of surfaces for welding which do not have circular edges.

In order to eliminate the difficulties described, friction welding methods and devices have become known in which the workpieces, pressed together along the surfaces to be welded, are heated to welding temperature by a relative oscillatory movement to and fro. According to the size of the workpieces, these oscillations can be effected at a greater or lesser frequency, and in a borderline case even sonic or ultrasonic oscillations are employed to set the workpieces in motion.

It has been shown that the already known methods referred to lead to satisfactory results only in a few cases. The employment of high frequencies is usually limited to relatively small workpieces, and in that procedure it is more particularly possible only to a very limited degree to make a free selection of the frequency and the amplitude of oscillation, so that in numerous cases it is not possible to operate under optimum conditions. If relatively low frequencies of oscillation are employed, as is necessary more especially with large and heavy workpieces, then the irregularity of the relative velocity of motion of the two workpieces makes itself noticeable to a disturbing degree, and in particular it may happen that at the reversal points of the oscillation, where the relative velocity of motion is zero, an undesired weld occurs in certain fractional areas of the surface to be welded, so that the welding process is disturbed or, indeed, entirely interrupted.

All known methods of friction welding have the further disadvantage that it is difficult to change while at maximum speed and under well-defined conditions from the moving phase to the immobile state, as well as to achieve the desired final relative welding position of the two workpieces.

The invention therefore proceeds from the problem of devising friction welding methods and devices in which the foregoing drawbacks and difficulties are no longer present and in which, especially in surfaces for welding having marginal boundaries of any kind whatever, welding proceeds under well-defined conditions which are to a considerable degree freely chosen, and leads to uniform and reproducible results.

SUMMARY OF THE INVENTION

In order to solve the problem as posed regarding the procedure, the invention starts out from a method of friction welding for surfaces of whatever marginal boundary formation in which the two workpieces are arranged against each other in respect of the surfaces to be welded and are heated to welding temperature by a relative oscillatory movement proceeding along the surfaces for welding. In this procedure the method according to the invention is characterized in that relative oscillatory movement is effected by way of a relative rotatory movement of the workpieces which remain substantially parallel to each other.

In the method according to the invention, in contrast with the already known process involving linear oscillations to and fro, the decisive advantage emerges that at no point in time during the mutually effected rotatory movement does the relative velocity of the workpieces along the welding surfaces fall to zero. Further, to this must be added the advantage that the problems of resonance which of necessity occur in the case of to-and-fro oscillatory movements, and the large mechanical loads in the welding equipment, are obviated in a fundamental manner. Apart from this, a decisive advantage emerges, that the relative velocity of the workpieces at all locations along the surface to be welded is of equal magnitude. Therefore, according to the method of the invention, surfaces of whatever size and of whatever type of marginal boundary can be welded with a uniformity, reproducibility and safety in operation that has hitherto been unobtainable, there furthermore being considerable freedom to select the extent and frequency of the rotatory movement and it being possible to influence the welding operation to a considerable degree by alterations in the timing associated with the said variables.

A particularly advantageous development of the method according to the invention is characterized in that, at the commencement of the welding operation, the amplitude of the relative rotatory movement is raised from zero upwards. In this way the two workpieces can first be positioned precisely in relation to each other, and then the welding operation can be set in motion continuously through a gradual increase in the amplitude of the relative rotatory movement up to the desired time-conditioned production of heat along the surfaces to be welded. An advantage which entirely corresponds to this is possible in a further development of the invention through the circumstance that, towards the termination of the welding operation, the amplitude of the rotatory movement is decreased towards zero. By this means the effect can be achieved that the two workpieces take up precisely the desired relative position at the time at which they become finally joined together (e.g. in the already known way, through increasing the contact pressure).

A further advantageous development of the method according to the invention is characterized in that the parameters of the method, more particularly the contact pressure applied along the surface for welding and/or the frequency and/or the amplitude of the rotatory movement are altered depending on the condition of the workpieces along the friction surfaces and/or on the size of the friction-affected area. In this way it is possible to control as desired, within wide limits, the time-conditioned production of heat per unit of surface area for welding, including even when the size of the friction-affected surface alters, for example during the butt-welding of hollow bodies having relatively thin walls and only contacting each other in a friction action, from a certain amplitude of relative rotatory movement upwards, at one spot along their abutting surfaces, this spot migrating across the abutting surfaces in the course of the rotatory movement. Especially in a further development of the invention the advantageous possibility exists that the frequencies and the amplitude of the rotatory movement should be altered in dependence on each other, preferably in such a manner that the relative velocity of motion of the workpieces is maintained within a prescribed range, and preferably remains approximately constant. It is therefore possible, for example, by decreasing the amplitude of the rotatory movement (towards the termination of the welding operation), at the same time to increase the frequency of the rotatory movement and so maintain the relative speed of movement approximately constant until shortly before the end of the welding operation. This method of proceeding is favored because of the circumstance that, upon decreasing the amplitude of the relative rotatory movement, the well-known effect occurs — the angular momentum of the revolving mass attempts to increase the rotatory velocity.

The alteration in the parameters of the method, more especially the mutually dependent control or adjustment of the frequency and the amplitude of the rotatory movement, is also of advantage if, before the actual welding operation, the surfaces of the workpieces that are to be joined are rendered smooth, or if the workpieces are reduced first to a prescribed dimension. Such operations, in which finally only the removal of material is desired, are preferably carried out with a high frequency but a small amplitude in respect of the relative rotatory movement. It is naturally possible to permit such processes to take their course completely automatically. Thus, for example in series production, it is possible to insert the workpieces with a relatively excessive length, and while continuously checking by means of a measuring device comprising a gauge or graduated rule first to shorten them by means of a high frequency and a reduced amplitude in the relative rotatory movement until, upon a prescribed ideal length being achieved, the gauging device emits a signal which brings about the start of the actual welding operation and/or of the contact pressure, the rotatory frequency being simultaneously decreased. In this procedure, naturally any alteration in length occurring during welding, for example the customary shortening action, can be appropriately borne in mind. Even the actual welding operation can be proceeded with automatically without further difficulty, for example with the aid of a programme-control device duly programmed on the basis of preliminary trials, so that the desired product is obtained in series production with a great degree of uniformity.

A particularly simple embodiment of the method according to the invention is characterized in that at least one workpiece is started substantially parallel to itself into a rotatory movement about an axis running at a right angle to the surface to be welded.

A further possible embodiment is characterized in that the two workpieces are started into linear oscillatory movements normal to each other at the same frequency but with the phase displaced in relation to one another. This form of embodiment in particular offers the advantage that conventional linear oscillator drives may be employed; the difficulties unavoidable with such linear oscillatory drives in respect of phenomena of resonance and mechanical loads in the welding equipment frequently do not carry much persuasive weight against the fundamental advantage also present in this form of embodiment, namely that the relative velocity of the two workpieces at no time drops to zero, not even at the reversal points of the linear oscillatory movements.

Of particular advantage is an embodiment which is characterized in that the rotatory movement is a circular movement the amplitude of which is determined by its radius. In this embodiment the relative velocity of the workpieces is not only constant at all locations on the surfaces to be welded but is also timewise constant within the rotatory movement, and accordingly, even given relatively low frequencies as regards the rotatory movement (of the type that may possibly be employed more particularly with large workpieces), it has been possible to obtain an extremely uniform production of heat, with all the advantages arising therefrom. If, in the manner previously described, the rotatory movement is obtained through the two workpieces each carrying out a linear oscillatory movement, then in accordance with a further advantageous form of embodiment of the method according to the invention it is possible to obtain the particularly favorable circular form of the rotatory movement through the circumstance that the two linear oscillatory movements are carried out as harmonic oscillations of identical amplitude with a phase shift of 90°.

An advantageous device to carry out the method according to the invention, and one in which at least one workpiece is able to be fastened to a holder able to move and be driven parallel to the workpiece, is characterized in that, for driving the holder, there is provided an eccentric body capable of being driven about an axis of rotation, on which body there is defined a circular rotatory path with an eccentricity adjustable vis-a-vis the axis of rotation, and in that the holder is movable at least two-dimensionally in a plane corresponding to the orientation of the surface to be welded, and is guided on the rotatory path of the eccentric body so that, upon rotating the eccentric body about the axis of rotation, all parts of the holder perform, parallel to the latter, rotatory movements of equal size and circular shape, the radius of these being equal to the eccentricity of the eccentric body that results from adjustment action.

The employment of eccentrics has already been proposed in the context of friction welding, this being, however, merely with a view to producing a to-and-fro oscillatory movement the disadvantages of which have been described in the opening paragraphs.

To adjust or shift the eccentricity of the eccentric body numerous devices may be used, these chiefly being based on the fact that the eccentric body with the rotatory path defined with respect to that body is shifted relatively to the axis of rotation. According to a development of the invention, this proves possible in a particularly elegant manner through the fact that on the eccentric body there is defined a second circular rotatory path the axis of which lies with a fixed eccentricity parallel to the axis of the first rotatory path, and that a second eccentric body is provided on which a third circular rotatory path is defined which matches the second rotatory path, slides along it and is situated, with an invariable eccentricity, parallel in respect of its axis to the axis of rotation, and that a coupling device is provided which joins the two eccentric bodies rigidly but is capable of adjustment to various mutual angular positions, so that the resultant eccentricity of the first rotatory path, dependent on the mutual angular positions of the eccentric bodies, is infinitely adjustable with reference to the axis of rotation. In this situation, the eccentricity of the first rotatory path in relation to the second rotatory path is preferably equal to the eccentricity of the third rotatory path in relation to the axis of rotation, so that a circular rotatory movement of the holder and of the workpiece attached thereto results from this.

According to a further form of embodiment of the invention, it is particularly advantageous if, for the purpose of adjusting the resultant eccentricity, there is provided adjustment means capable of actuation during the rotation of the eccentric body. The expert will be familiar with numerous possibilities of undertaking adjustments to rotating parts; the numerous already known possibilities of regulating turbine blades, aircraft propeller blades and the like will be recalled.

In order to guide the holder or the workpiece fastened to the holder parallel to itself in the requisite manner, in a further development of the invention the holder can be pivoted, via a parallelogram linkage, on a carriage which is displaceable normally to the axis of rotation.

In a further, advantageous development of the invention, a device in accordance with the invention may be characterized by a counterweight device which is adjustable in dependence on the resultant eccentricity adjusted for at a given moment in such manner that the resulting imbalance in respect of the axis of rotation is substantially compensated for as regards all the adjustable values of the resultant eccentricity. In the embodiment with two eccentric bodies, this can be effected in accordance with a further development of the invention through the fact that to the two eccentric bodies there is in each case connected rigidly a compensatory weight arranged at a prescribed distance from the axis, in each pair (made up of an eccentric body and a compensatory weight) the centers of gravity of the eccentric body and of the compensatory weight being in the same axial planes but on contrary sides of the axis, and through the fact that the sizes of the two compensatory weights are determined by the circumstance that, given two differing resultant eccentricities, the device is compensated, for example, both with the resultant eccentricity at zero and also with the resultant eccentricity at maximum. With such a formation of the compensatory device the result is a compensating arrangement of weights throughout the full adjustable range of eccentricities.

The compensatory weights will preferably be exchangeable and/or axially and/or radially adjustable, the axial adjustability more particularly serving to adjust the radial plane of the centers of gravity of the compensatory weights in accordance with the character of the workpiece fastened on the holder. A particularly simple design formation of the compensatory device as described, with its two compensatory weights, is characterized in that the compensatory weight belonging to the first eccentric body is fastened to a sleeve or enclosing ring rotatably coupled with the first eccentric body.

Further developments of the invention are characterized by mechanisms to alter the rate of rotation of the eccentric body, as well as devices for the prescribable linking together of alterations in resultant eccentricity and alterations in the rate of rotation of the eccentric bodies. With such devices it is possible to realize the advantageous guidance means detailed in connection with steps relating to the present method, in these guidance means the frequency and/or the amplitude of the rotatory movement being altered on their own or in mutual dependence. Corresponding device-associated measures may naturally also be envisaged in the embodiment which provides two linear oscillations perpendicular to each other.

The invention is hereinafter described, by way of example, with reference to the accompanying drawings and the illustrative embodiments illustrated therein, all features differing from the present state of the art possibly possessing significance germane to the invention.

Figure 2:
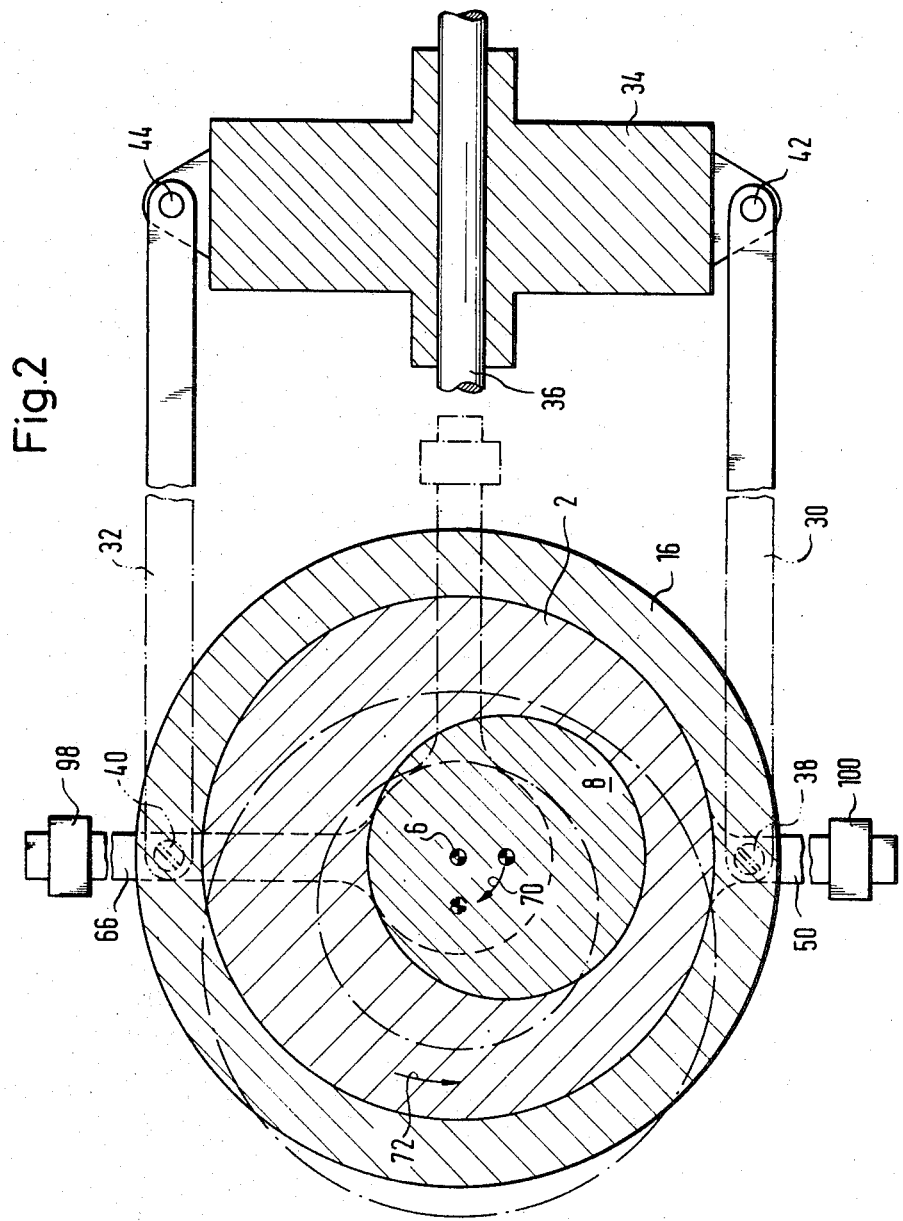
Figure 3:
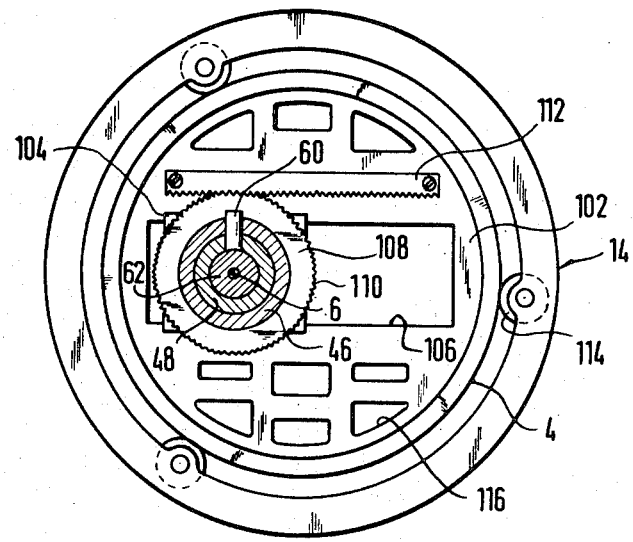
Figure 4:
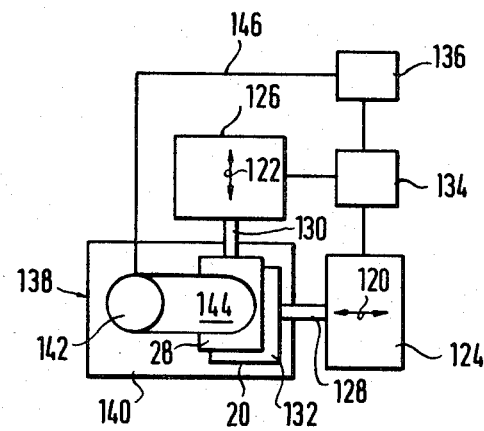

FIG. 1 illustrates the invention with the assistance of a device shown in an axial section entirely diagrammatically, FIG. 2 is an entirely diagrammatic radial section on the line II — II in FIG. 1, FIG. 3 explains a further possible embodiment of the invention in a sectional view similar to FIG. 2, and FIG. 4 is a diagrammatic view of a further possible embodiment of a device according to the invention.

The device shown in FIGS. 1 and 2 comprises an eccentric body 2 with a circular rotatory path 4 in the form of a cylindrical surface. The eccentric body 2 is capable of being driven around an axis of rotation 6, the distance between the axis of rotation 6 and the axis of the rotatory path 4, i.e., the resultant eccentricity $E_r$ of the eccentric body 2, is infinitely variable. With this aim in view, in the device shown in FIGS. 1 and 2 there is a second circular rotatory path 10 defined on the eccentric body 2, which path is likewise formed as a cylindrical surface in the illustration chosen in these Figures. The two rotatory paths 4 and 10 are included within a fixed eccentricity E, and a second eccentric body 8 is provided on which a third circular rotatory path 12 is defined, this matching the second rotatory path 10 of the first eccentric body 2 and being rotatably borne upon the latter. The eccentricity E of the first rotatory path 4 in relation to the second rotatory path 10 is equal to the eccentricity E of the third peripheral path 12 with reference to the axis of rotation 6.

On the first peripheral path 4 of the eccentric body 2 there is carried a holder 14; in the embodiment shown here, the holder 14 in fact consists of a ring 16 slidably carried on the peripheral path 4, and of a plate 18 attached to the ring, on the plate there being a workpiece 20 fastened in such a manner (for example by the screws 22, 24 shown) that the desired welding surface 26 along which the workpiece 20 is intended to be joined to another workpiece 28 is situated normally to the axis. The other workpiece 28 is maintained stationary in a manner not illustrated. It would naturally also be possible to cause this second workpiece to effect movement similar to that of the first. The holder 14 is displaceable normal to the axis and parallel to itself, but is restrained against rotation. In the embodiment shown here, as can be seen from FIG. 2, this is achieved in that the ring 16 is pivotally attached, by means of parallelogram-type linkage consisting of links 30, 32, to a carriage 34 which is displaceable along a guide means 36 normal to the axis 6. The links 30, 32 are pivotally attached at locations 38, 40 and 42, 44 to the ring 16 or the carriage 34 respectively.

The two eccentric bodies 2 and 8 are rigidly connected to each other by means of a coupling and are able to rotate together about the axis 6; the coupling device is adjustable, however, to various relative angular positions of the eccentric bodies 2, 8. With this in view, a final control element rotatable about the axis 6 and in the form of a sleeve or enclosing ring 46 is provided. The sleeve 46 is adjustable as regards its angular position on a shaft 48 firmly connected to the second eccentric body 8 and coaxial with the axis of rotation 6, but nevertheless is arranged so as to be incapable of axial displacement, and it has an attachment 50 with a radial slot 52. The radial slot 52 is engaged by a finger 54 projecting from the first eccentric body 2. This slot-type guidance system 52, 54 thus links the sleeve 46 and the first eccentric body 2 for common rotation relatively to the second eccentric body 8. In order to adjust and ascertain the relative angular position between the sleeve 46 and the shaft 48, i.e., to adjust and fix the relative angular position of the two eccentric bodies 2, 8 and thus their resultant eccentricity $E_r$ effective at the holder 14, in both the sleeve 46 and the shaft 48 there are slots 56 and 58 respectively, provided in the same axial zone, these slots crossing diagonally of the direction parallel with the axis 6, and the connection between the sleeve 46 and the shaft 48 is effected by means of a radial pin 60 passing with a good fit through the two slots 56, 58, the pin being fastened to a rod 62 axially displaceable within a central bore of the shaft 48. The rod 62 is preferably rotatably coupled to the shaft 48 additionally by a spline or sliding key arrangement 64 or a corresponding profiled system. Mutual axial movements of the sleeve 46 and the shaft 48 are prevented in any appropriate manner, for instance by an extension 66 from the shaft 48 and a securing ring 68 let into a peripheral groove around the shaft 48.

It will be seen that the axial position of the rod 62 determines the relative angular position of the two eccentric bodies 2 and 8, and thus their resultant eccentricity $E_r$. If $\alpha$ is the angle which the radii of eccentricity of the two eccentric bodies form with each other, the resultant eccentricity $E_r$ emerges as $$E_r = 2E \cdot \cos(\alpha/2)$$

The resultant eccentricity $E_r$ is therefore infinitely adjustable throughout the range between zero and 2E. In FIG. 1 and in the solid lines of FIG. 2 the condition $E_r$ is represented as equal to zero. The condition of $E_r$ equalling 2E (maximum resultant eccentricity) is shown in FIG. 2 in chain-dotted lines, in contrast with the condition wherein $E_r$ is equal to zero the first eccentric body 2 now being displaced, in accordance with the arrow 72, by 90° in a counter-clockwise direction, and the second eccentric body 8, in accordance with the arrow 70, being displaced by 90° in a clockwise direction.

If a relative angular position of the eccentric bodies 2 and 8 (as determined by the axial position of the rod 62) is maintained and if the eccentric bodies are allowed to rotate about the axis of rotation 6, then all the locations appertaining to the holder 14 and to the workpiece 20 attached thereto carry out equally large rotatory movements parallel to each other and normal to the axis 6 in circular paths. The amplitude of the rotatory movements is determined by the radius of these circular paths, and this radius equals the resultant eccentricity $E_r$, which can be altered during common rotation of the two eccentric bodies 2 and 8, by means of axial displacement of the rod 62, continuously and as desired between a position where $E_r$ equals zero and a maximum value.

The rotatory drive of the eccentric bodies 2 and 8 can be effected in any desired manner. By way of example, in FIG. 1 there is an indication that the sleeve 46, supported in a bearing 74, is provided with a gear-toothed rim 76 which meshes with a pinion 78 of a drive motor 80. Any means may be provided to produce and receive the axial forces applied during welding, for example a thrust ball bearing 82 between the facing end faces of the second eccentric body 8 and of the holder 14, and a thrust bearing (not shown) at the free end of the shaft 48.

In order to adjust the rod 62 in an axial direction, any type of adjustment device may be employed. In the possibility diagrammatically illustrated in FIG. 1, the rod 62 has, outside the shaft 48, a flange 84 with sliding surfaces on either side. A fork 88, axially displaceable by means of a geared actuator 86, extends down around the flange 84 and, through the interposition of ball bearings 90, engages with minimal play the side surfaces of the flange 84.

The geared actuator 86 is associated with a controller 92 for selecting the adjustment of the axial position of the rod 62, and thus the resultant eccentricity $E_r$. The drive motor 80 is associated with a controller 94 for selecting the adjustment of the rotational speed of the drive motor 80. The controllers 92 and 94 are either adjustable separately or, as is shown in FIG. 1, are so connected to each other by a control device 96 that a certain, preferably variable, dependence is prescribed between the speed of the drive motor and the resultant eccentricity $E_r$.

It is possible with the device shown by way of example to commence a welding operation with the resultant eccentricity initially zero, and in this event the workpiece 20 remains in repose with the eccentric bodies 2 and 8 rotating, so that the workpieces 20, 28 can be precisely positioned vis-a-vis each other. In that case, by a corresponding adjustment of the shift-rod 62 the resultant eccentricity $E_r$ will be gradually raised above zero, so that the workpiece 20 performs, relatively to the other workpiece 28, a circular rotatory movement which is equally large at all locations and which takes place with equal velocity along the path. In this procedure the frictional heat required for welding will be produced. The output of heat depends substantially on the rate of rotation of the eccentric bodies 2, 8 and on the resultant eccentricity $E_r$, and it is possible without further difficulty to arrange a situation whereby, for example automatically with the assistance of the control device 96, the relative velocity along a path of the workpieces 20, 28 remains constant within a certain range of variation of the resultant eccentricity $E_r$, or alters in a desired and prescribed manner. Immediately the temperature required for welding is attained in the welding surface 26 (an event which is recognizable, for example, by a drop in the intake of power to the drive motor 80), the resultant eccentricity $E_r$ is continuously reduced to zero by a corresponding shifting of the rod 62, so that finally the workpieces are welded together in a relative position exactly corresponding to the initial position. The continuity and uniformity of the entire procedure ensures optimum quality in the welded joint that is achieved.

The arrangements to produce an axial contact force between the workpieces 20 and 28 are not illustrated in the drawings; they may be carried out in a conventional manner, for example.

The imbalance in the rotating system may be eliminated by means of a compensating arrangement which automatically matches the varying resultant eccentricity arising according to the adjustment. To this end, in the embodiment of FIGS. 1 and 2 two compensatory weights 98 and 100 are provided, these being connected rigidly to the eccentric bodies 8 and 2 respectively. The compensatory weight 98 is displaceable axially, i.e., parallel to the rotation axis, on the extension 66 projecting from the shaft 48, in an axial guideway provided on the extension, and is fixed in the required axial position by a locking screw 99. The compensatory weight 100 is mounted in a corresponding manner on the extension 50 of the sleeve 46; to fix the axial position a locking screw 101 is again employed. The radial dimensions of the extensions 50 and 66 must naturally be large enough to allow adjustment to compensate for maximum resultant eccentricity $E_r$ without hindrance from the compensatory weights 98 and 100 respectively. This is indicated in FIGS. 1 and 2. In the adjustment for maximum resultant eccentricity indicated in broken lines in FIG. 2, the feature is disregarded that in that situation the two compensatory weights would provide mutual hindrance. This can easily be avoided by proper design; however, in practical operation as well this adjustment facility can be omitted.

It will be seen that the compensatory weights 98 and 100 are in a conventional manner opposite the centers of gravity of their pertinent eccentric bodies 8 and 2 respectively, and both are at a prescribed radial distance from the axis of rotation 6. This more particularly signifies that, given a relative displacement of the eccentric bodies 2 and 8, the compensatory weights 100 and 98 will likewise shift relatively to each other only in a circumferential direction, but will carry out no movement in a radial direction, although the eccentric body 2 connected to the compensatory weight 100 in a rigid manner moves in a radial direction in this situation. The dimensions of the compensatory weights 98 and 100 are determined by the requirement that, given two different values for resultant eccentricity, the imbalance is eliminated, for instance in the case of $E_r = 0$ and $E_r = 2E$. Then the imbalance will be removed for all other values of $E_r$.

The compensatory weights may, in the embodiment illustrated in FIGS. 1 and 2, not only be displaceable axially, but they can naturally also be replaced by others. By this means it is possible to make the size and position of the compensatory weights 98, 100 match the character of the workpiece mounted at any time on the holder 14. In this situation the axial adjustability of the compensatory weights 98, 100 more particularly serves the purpose of making the compensatory weights have an effect as far as possible in that axial range within which the forces of imbalance produced by the eccentric bodies and the workpiece fastened to the holder 14 also have their effect. By this means the resultant forces transverse to the axis 6 are kept small. Naturally the compensatory weights may also be attached so as to be radially adjustable, for example in such a way that the extensions 50 and 66 are executed as two parts relatively adjustable in a radial guideway. Such arrangements are not illustrated in the drawings.

In order to keep the imbalance minimal from the beginning, or for other reasons, the eccentric bodies can naturally be also built in a light, non-massive mode of construction. In addition, it is not necessary for all the peripheral paths of the eccentric bodies 2, 8 and of the holder 14 to be formed, in the manner shown here, as continuous cylindrical surfaces.

FIG. 3 shows in an entirely diagrammatic manner one example of a further possible embodiment in which the displacement of the first eccentric body 2 relatively to the axis of rotation 6 is brought about not with a second eccentric body but with a hub unit displaceable in the manner applying to a carriage guidance system. The first eccentric body 2 here consists of a circular disc 102 upon which, at the outer periphery, the first peripheral path 10 is applied in the form of a circular-cylindrical annular surface. In the disc 102 there is a carriage 104 which is displaceable in a guideway 106 along one diameter of the disc. The carriage is fastened to a hollow shaft 48 concentric with the axis of rotation 6. As in the form of embodiment according to FIGS. 1 and 2, on the hollow shaft 48 there is a final control element in the form of a sleeve 46 arranged to be rotatable but axially located. The sleeve 46 has a flange 108 with a toothed segment 110 which meshes with a toothed rack 112 fastened on the circular disc 102. Consequently, by turning the sleeve 46 relatively to the shaft 48, the eccentric body 2 can be displaced in the direction prescribed by the carriage guidance means 106 relatively to the axis of rotation 6 continuously to different resultant eccentricities. In the embodiment of FIG. 3, for the purpose of linking together and of the relative displacement of the sleeve 46 and the shaft 48, similar means to those of the embodiment shown in FIGS. 1 and 2 are utilized. In the bore of the shaft 48 a shift-rod 62 is again arranged so as to be axially displaceable. A pin 60 fastened to the rod 62 passes through diagonal slots (not shown here) which are formed in the shaft 48 or the sleeve 46 so that, as in the embodiment according to FIGS. 1 and 2, on axial displacement of the rod 62 relatively to the shaft 48 a rotation of the sleeve 46 relatively to the shaft 48 and consequently a corresponding adjustment of the resultant eccentricity $E_r$ occurs. The holder 14 is here carried by means of rollers 114 on the peripheral path of the eccentric body 2 and is likewise two-diamensionally movable, parallel to itself and perpendicularly to the axis of rotation 6, so that upon rotation of the shaft 48 and the eccentric body 2 connected rigidly to the shaft by way of the carriage guidance means 106 the desired rotatory movement occurs with the radius $E_r$ at all locations of the holder 14, just as in the embodiment of FIGS. 1 and 2. To save weight and to decrease the forces of imbalance, the disc 102 is provided with holes 116.

Instead of the mechanical arrangement shown in FIGS. 1 to 3, for the alteration of the resultant eccentricity $E_r$, hydraulic, electrical or other arrangements may be employed. For example, a carriage which is executed in a similar manner to FIG. 3 and to which the drive shaft concentric with axis of rotation 6 is fastened, may also be coupled to the eccentric body by means of a hydraulic regulating arrangement. The design and manufacture of this type of regulating arrangement, and other regulating devices too, as well as the free choice of already known mechanical, electrical, pneumatic and hydraulic means to realize constructional modifications are within the skill of the expert without further difficulty.

In a very diagrammatic manner FIG. 4 explains a device in which the relative rotary movement of the two workpieces 20, 28 is achieved through the workpiece being carried so as to be individually capable of to-and-fro movement in two directions, 120 and 122, which are at a right angle to each other, and through the workpieces being movable by means of respective oscillatory drives 124 and 126 effective in these directions. The workpieces are coupled to the oscillatory drives by means of holders 128 and 130 respectively, and make contact with each other along a welding surface which is, in the sense of FIG. 4, constituted by the upper surface 132 of workpiece 20 and the lower surface of workpiece 28, and is located parallel to the plane defined by the two directions of oscillation 120, 122. The oscillatory drives are synchronized by means of a synchronizing device 134. Furthermore, a control arrangement 136 is provided by means of which the oscillatory frequency as well as the relative phase relationship and the amplitude of the two oscillatory drives can be altered. With the assistance of an ordinary press arrangement 138 possessing a base plate 140, a press cylinder workpieces and a pressure plate 144, it is possible to have pressure exerted in a conventional manner on the workpiece perpendicularly to the welding surface. It is naturally also possible at the same time to form and employ one of the oscillatory drives 124, 126 in a known way as a press arrangement. The press arrangement 138 is able to be controlled by way of control lines 146, for example from the control arrangement 136.

If both oscillatory drives 124, 126 operate at the same frequency and amplitude and with a phase shift of 90°, the result is a circular relative rotatory movement of the workpieces in manner similar to the embodiments of FIGS. 1 to 3. If the amplitudes are different, then the result is elliptical relative rotatory movements. Further modifications of the pattern of the relative rotatory movement can be achieved by deviations from the harmonic form of oscillation. As in the embodiments described with reference to FIGS. 1 to 3, it is also possible in this context to control in mutual dependence and, more particularly, to alter in the opposite sense the frequency and the amplitude of the relative oscillatory movement. This may, for example, be effected thus, that the amplitude of oscillation is continuously increased from zero upwards, and after reaching the desired welding temperature is again decreased to zero, the relative velocity of the workpieces being kept constant, at least within a certain range of amplitudes, by a corresponding oppositely directed alteration of the frequency.

In the embodiment according to FIG. 4, the difficulty which is typical of oscillatory drives occurs, that particularly in the case of heavy and large-size workpieces deviations from the harmonic course of the movements occur; this, nevertheless, is the prerequisite for the phenomenon that the relative movement of the two workpieces is circular and the relative velocity is constant. In this connection, embodiments such as those according to FIGS. 1 to 3, in which at least one of the workpieces performs a genuine rotatory movement, are considerably more advantageous; furthermore, in this arrangement no oscillatory strain on any structural members occurs. It is naturally also possible without further difficulty to carry out rotatory movements with both workpieces.

Other embodiments of the invention are possible without exceeding the scope of the invention.

I claim:

1. A method for frictionally welding together the abutting surfaces of two workpieces to be welded together which comprises holding said surfaces together under pressure and substantially parallel to each other, producing substantially equal circular relative orbital movement between all points of said surfaces while restraining said surfaces against rotation, whereby said surfaces are frictionally heated to welding temperature, the amplitude of said orbital movement being determined by the radius of said orbital movement, and adjusting the amplitude of said relative orbital movement by altering the radius thereof during the welding process in accordance with conditions prevailing within the friction area.

2. A method according to claim 1, wherein, at the commencement of the welding operation, the amplitude of the relative orbital movement is increased from zero upwards.

3. A method according to claim 1, wherein, towards the termination of the welding operation, the amplitude of the orbital movement is decreased towards zero.

4. A method according to claim 1, wherein the contact pressure applied to the abutting surfaces and the frequency of the orbital movement, are altered during the welding process depending on conditions prevailing in the friction area.

5. A method according to claim 1, wherein the frequency and amplitude of the orbital movement are altered in dependence on each other, preferably in opposite senses in such a way that the relative velocity of motion of the workpieces is maintained within a prescribed range, and preferably remains approximately constant.

6. A method according to claim 4, wherein said alteration is made in dependence upon the size of the friction surface.

7. A device for frictionally welding together the abutting surfaces of two workpieces comprising means for mounting at least one of said workpieces on a holder, means for holding said abutting surfaces together under pressure, means including an eccentric body mounted for circular orbital movement about an axis perpendicular to said surface to produce substantially equal circular relative orbital movement between all points of said abutting surfaces, and including means for restraining said workpiece holder and said workpiece against rotation, and means for adjusting the eccentricity of said body relatively to said axis during the said orbital movement.

8. A device according to claim 7, wherein, to adjust the resultant eccentricity ($E_r$), the eccentric body with the orbital path located relatively thereto is shiftable relatively to the axis of rotation.

9. A device according to claim 7, wherein, to adjust the resultant eccentricity ($E_r$) of the eccentric body, a hub unit incapable of displacement relatively to the axis of rotation is provided, to which unit the eccentric body is attached in an adjustable manner.

10. A device according to claim 7, wherein on the eccentric body there is defined a second circular path the axis of which lies with a fixed eccentricity parallel to the axis of the first orbital path, and in that a second eccentric body is provided on which a third circular path is defined which matches the second circular path, is led along it and is situated, with invariable eccentricity, parallel as regards its axis to the axis of rotation, and in that a coupling device is provided which rigidly couples the two eccentric bodies but is capable of adjustment to various mutual angular positions of such bodies, so that the resultant eccentricity ($E_r$) of the first circular path that is dependent on the mutual angular position of the eccentric bodies is continuously adjustable with reference to the axis of rotation.

11. A device according to claim 10, wherein the eccentricity of the first circular path in relation to the second orbital path is equal to the eccentricity of the third orbital path in relation to the axis of rotation.

12. A device according to claim 10, wherein the coupling device has a control element rotatable about the axis of rotation, the element being adjustable as regards its angular position relative to the second eccentric body and being coupled for common rotation with the first eccentric body in the direction of the periphery.

13. A device according to claim 12, wherein the rotary connection between the control element and the first eccentric body has a slot-type guidance system extending in the radial direction and a finger which engages thereinto.

14. A device according to claim 12, wherein the control element has a sleeve or enclosing ring which is rotatable but axially located on a hollow shaft firmly connected to the second eccentric body and coaxial with the axis of rotation, in the sleeve and in the shaft there being slots provided in the same axial zone, these crossing diagonally of the axial direction, and in the hollow space in the shaft there is an axially displaceable rod on which is fastened a pin which passes through both slots and fills the width of the slots.

15. A device according to claim 7, wherein the holder for the workpiece is linked by way of parallelogram-type linkage to a carriage displaceable normally of the axis of rotation.

16. A device according to claim 7, wherein a mass balancing device is adjustable in dependence on the resultant eccentricity ($E_r$) adjusted for at a given moment, in such manner that the resulting imbalance in relation to the axis of rotation is substantially compensated for as regards all adjustable values of the resultant eccentricity.

17. A device according to claim 10, wherein to the two eccentric bodies there is in each case rigidly connected a compensatory weight arranged at a prescribed distance from the axis, in each pair provided by one of said eccentric bodies and a corresponding compensatory weight the centers of gravity of the eccentric body and of the compensatory weight being in the same axial planes but on contrary sides of the axis, and wherein the magnitudes of the two compensatory weights are determined by the fact that, given two differing resultant eccentricities, the device is compensated for mass imbalance, for example with the resultant eccentricity at zero and also with the resultant eccentricity at its maximum.

18. A device according to claim 17, wherein the compensatory weights are exchangeable.

19. A device according to claim 17, wherein the compensatory weights are axially and/or radially displaceable, the axial adjustability more particularly serving to adjust the axial position of the centers of gravity of the compensatory weights in accordance with the character of the workpiece mounted on the holder.

20. A device according to claim 7, wherein means are provided to alter the rate of rotation of the eccentric body.

21. A device according to claim 7, wherein means are provided for the prescribable linkage together of alterations in the resultant eccentricity with alterations in the rate of rotation of the eccentric body.

22. A device according to claim 7, wherein means are provided for exerting pressure on the workpieces perpendicular to the surfaces to be welded.

23. A device according to claim 17, wherein the compensatory weights are radially displaceable.

24. A device according to claim 14, including a compensatory weight rigidly connected to each of said eccentric bodies and arranged at a prescribed distance from the axis, the center of gravity of each eccentric body and its compensatory weight being in the same axial plane but on opposite sides of the axis, the magnitudes of the two compensatory weights being such that the device is compensated for mass imbalance for differing resultant eccentricities.

* * * * *